(12) United States Patent
Brobst et al.

(10) Patent No.: US 10,754,123 B2
(45) Date of Patent: Aug. 25, 2020

(54) FLEX MEMBER ACTUATOR

(71) Applicant: Datalogic USA, Inc., Eugene, OR (US)

(72) Inventors: Thomas J. Brobst, Allentown, PA (US); Jeff Hoskinson, Eugene, OR (US); Alana Giangrasso, Harleysville, PA (US)

(73) Assignee: DATALOGIC USA, Inc., Eugene, OR (US)

( * ) Notice: Subject to any disclaimer, the term of this patent is extended or adjusted under 35 U.S.C. 154(b) by 0 days.

(21) Appl. No.: 16/237,260

(22) Filed: Dec. 31, 2018

(65) Prior Publication Data
US 2020/0209517 A1    Jul. 2, 2020

(51) Int. Cl.
| | |
|---|---|
| G02B 7/10 | (2006.01) |
| G03B 17/02 | (2006.01) |
| G02B 7/09 | (2006.01) |
| G03B 5/00 | (2006.01) |
| G09G 3/00 | (2006.01) |

(52) U.S. Cl.
CPC .............. *G02B 7/10* (2013.01); *G02B 7/09* (2013.01); *G03B 5/00* (2013.01); *G03B 17/02* (2013.01); *G03B 2217/002* (2013.01); *G09G 3/001* (2013.01); *G09G 2320/0261* (2013.01)

(58) Field of Classification Search
CPC . G02B 7/10; G02B 7/09; G03B 17/02; G03B 5/00; G03B 2217/002; G09G 2320/0261; G09G 3/001
See application file for complete search history.

(56) References Cited

U.S. PATENT DOCUMENTS

| | | | |
|---|---|---|---|
| 2008/0144185 A1* | 6/2008 | Wang | ........................ G02B 3/14 |
| 2015/0192792 A1 | 7/2015 | Moriya et al. | |
| 2015/0219872 A1 | 8/2015 | Terajima | |
| 2015/0364980 A1 | 12/2015 | Liao | |
| 2018/0292730 A1* | 10/2018 | Ciabattoni | ............... G03B 7/00 |

FOREIGN PATENT DOCUMENTS

EP      3 032 326 A1    6/2016

OTHER PUBLICATIONS

Extended European search report dated Jul. 9, 2020, received in European Patent Application No. 19219533.7, 9 pages.

* cited by examiner

*Primary Examiner* — Padma Haliyur
(74) *Attorney, Agent, or Firm* — Shook, Hardy & Bacon LLP

(57) ABSTRACT

A camera system with an autofocus actuator with flex members is provided for actuating the lens of the camera. A set of flex members reside on opposite sides of a lens assembly with a lens. The flex members suspend the lens assembly within the frame of the camera. The flex members may be made of a material with a flexural modulus and ducts to enhance the flexural modulus. The flex members are optimized to provide linear movement of the lens assembly with limited lateral movement. The camera may further include a shuttle driver to move the lens of the camera and actuate a flex in the flex members.

20 Claims, 4 Drawing Sheets

FLEX MEMBER ACTUATOR

BACKGROUND

A bar code is a coded pattern of graphical indicia having a series or pattern of bars and spaces of varying widths that encode information. Bar codes may be one dimensional (e.g., UPC bar code) or two dimensional (e.g. a QR code). Systems that read and decode bar codes employ camera systems. These camera systems that read and decode bar codes are typically referred to as imaging-based bar code readers ("bar code readers") or bar code scanners.

In camera systems, it is often desirable to provide an automatic focus ("auto-focus") capability. By way of example, electro-mechanical autofocus assemblies for photo and video cameras are commonly available. In some conventional photo/video camera auto-focus designs, the auto-focus assembly ("focus actuator") is integrated in the camera system. Focus actuators traditionally include mechanical slide mechanisms or mechanical linkages that move a camera lens in a linear direction to adjust the focus of the camera system. Auto focus capabilities are advantageous in bar code readers because a camera system in focus of an object can more easily read a barcode.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects described herein provide a camera with a focus actuator that comprises two flex members.

In one aspect, a camera comprises a frame that extends from a first frame end to a second frame end opposite the first frame end. The frame includes an aperture extending from the first frame end to the second frame end. The first frame end has a first edge around the aperture. The second frame end has a second edge around the aperture. A lens shuttle is housed within the aperture. The lens shuttle is suspended by a first flex member and a second flex member ("flex members"). The lens shuttle has a first body end and a second body end and extends the length of the aperture. The lens shuttle is fit to house a lens assembly with a lens, the lens, the lens of the lens assembly is oriented toward the first body end. The first flex member couples the lens shuttle to the frame where the first flex member coupled to the first frame end and the first body end. Similarly, opposite the first frame end, the second flex member couples the lens shuttle to the frame, the second flex member coupled to the second frame end and the second body end.

In some aspects, the first flex member comprises an aperture configured to allow the lens assembly a full view of a subject for capture. The first flex member may also be fixed to the frame by the first edge and the second flex member is fixed to the frame by the second edge.

In various aspects, the first flex member and the second flex member opposite one another may comprise a material with a flexural modulus. With the flexural modulus, as the first flex member and second flex member flex (or actuate) in the same linear direction with respect to the frame, the lens shuttle equally moves in a linear direction with respect to the frame. In this same aspect, the first flex member and second flex member may be made of a material that the maximum deflection of the linear movement of the lens shuttle causes a maximum stress on the flex that is less than the material's fatigue stress limit. In the same aspect where the flex members have a flexural modulus, the first flex member and the second flex member may further comprise a series of ducts configured to enhance the flexural modulus. In some aspects, the flex members comprise a sheet of Beryllium-Copper.

In an alternative aspect where the flex members comprise a material with a flexural modulus, the flex members also comprise a flex camera aperture to allow the lens assembly a full view of a subject for capture. Further, in this aspect a shuttle driver is configured to articulate the lens shuttle housed within the aperture, configured to flex the first flex member and second flex member a defined flex distance. In some aspects the shuttle driver comprises a voice coil, in other aspects the shuttle driver comprises a cam driven by a stepper motor. When the shuttle driver comprises a voice coil, the cam may be connected to the lens shuttle using a first follower and second follower rotatably fixed to an idler. The idler may be fixed to the lens shuttle. The first follower is configured to reside outside of the cam and the second follower is configured to reside inside the cam, and configured such that actuation of the cam moves the idler.

In some aspects, the lens assembly is configured to identify bar code labels. In these aspects, the defined flex distance may be the optimal distance for the lens assembly to adjust to at least one of various sizes and resolutions of bar code labels.

In some alternative aspects the cam is driven by the stepper motor to provide linear actuation of the lens shuttle housed within the aperture and as the lens shuttle is actuated flex the first flex member and second flex member a defined flex distance. In this aspect, a position sensor may be configured to read the angle of rotation of the cam and relay the information to a computer device. In some aspects, the flex distance is between −1.5 mm and +1.5 mm from a no-flex state of the first flex member and second flex member.

BRIEF DESCRIPTION OF THE DRAWINGS

The various objects, features and advantages of the present invention are fully explained in the detailed description of the preferred aspects of the invention found below, together with the figures, wherein.

DETAILED DESCRIPTION

In camera systems it is desirable to have an image in focus. A camera can place an image in focus by adjusting the position of the lens of the camera closer to or farther away from an object. Electro-mechanical autofocus assemblies for photo and video cameras, called focus actuators, are commonly used to adjust the position of the camera lens. When high speed cameras are needed, such as in the instance of a bar code scanner, the motion of the focus actuator must be linear, limited to a single axis. Any movement off the linear axis can have a negative effect on the focus of the camera.

Focus actuators previously used to autofocus a camera include mechanical slides. These mechanical focus actuators have several disadvantages, including that they break after long term use. One reason mechanical focus actuators fail is due to the mechanical parts rubbing against one another. When a camera must autofocus in quick succession, these mechanical parts can rapidly deteriorate. Some applications that require an autofocus camera to focus rapidly include reading bar codes along a conveyer belt in a warehouse and reading luggage barcodes at an airport.

A focus actuator in a camera system that can withstand many rapid operations while maintaining only a linear operation is described herein. Aspects described herein advantageously actuate a camera lens with no mechanical wear.

Figure 1:
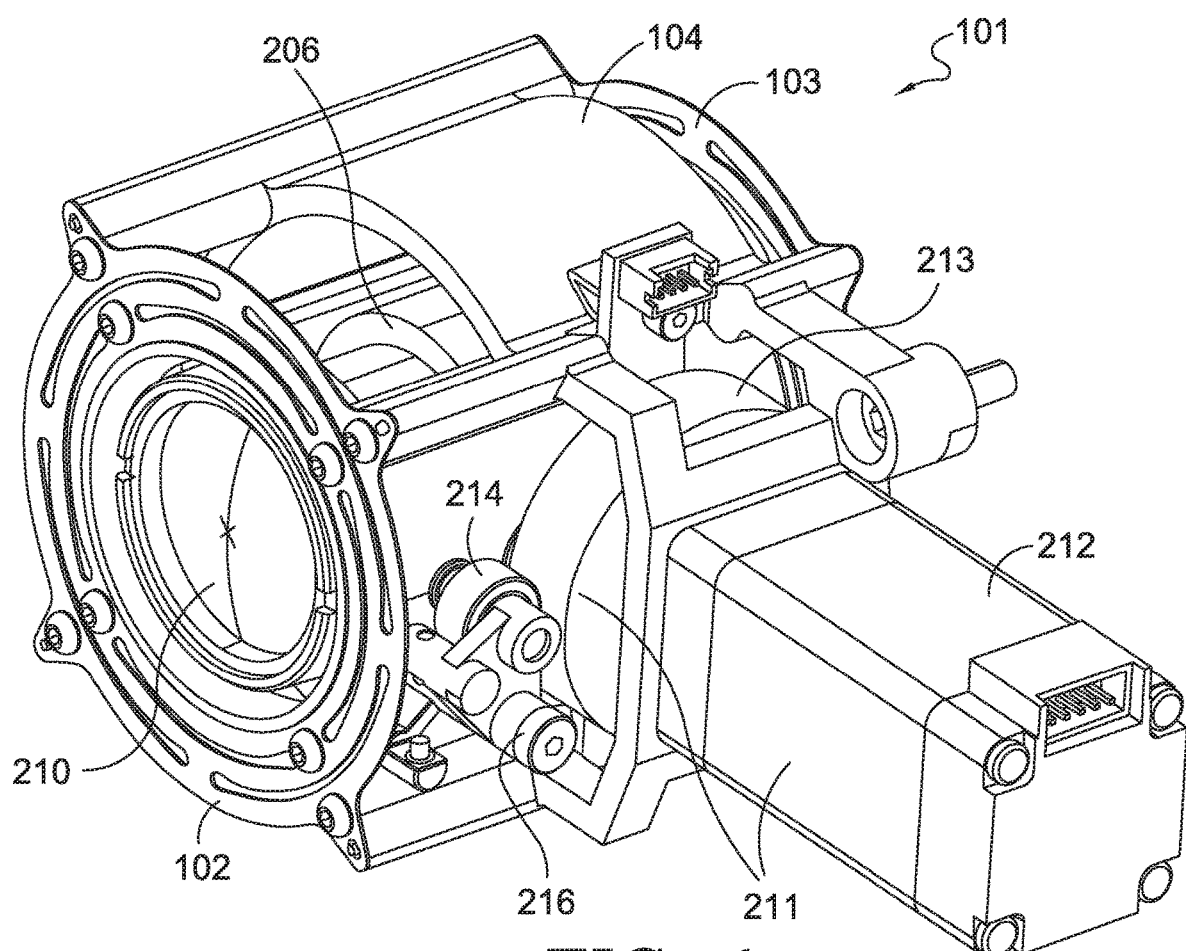
FIG. 1 is a perspective view of an exemplary apparatus driven by a cam and stepper motor.

FIG. 1 is a perspective view of an exemplary apparatus driven by a cam and stepper motor. FIG. 1 displays the assembled view of a camera system 101. The first flex member 102 is opposite the second flex member 103. The first flex member 102 and second flex member 103 are mounted to the frame 104. The frame houses a lens shuttle 206 suspended by the first flex member 102 and the second flex member 103. The lens shuttle 206 is configured to house a lens assembly (shown in FIG. 2). The lens assembly includes a lens 210. The lens shuttle 206 is able to be actuated in a linear direction, forward and backward within the frame 104. The lens shuttle may be actuated by a shuttle driver 211. In the exemplary embodiment shown, the shuttle driver is a stepper motor 212 and cam 213. Rotation of the cam 213 actuates the lens shuttle 206. The cam 213 is connected to the lens shuttle 206 by a combination of the idler 216, first follower 214, and second follower (shown in FIG. 2).

Figure 2:
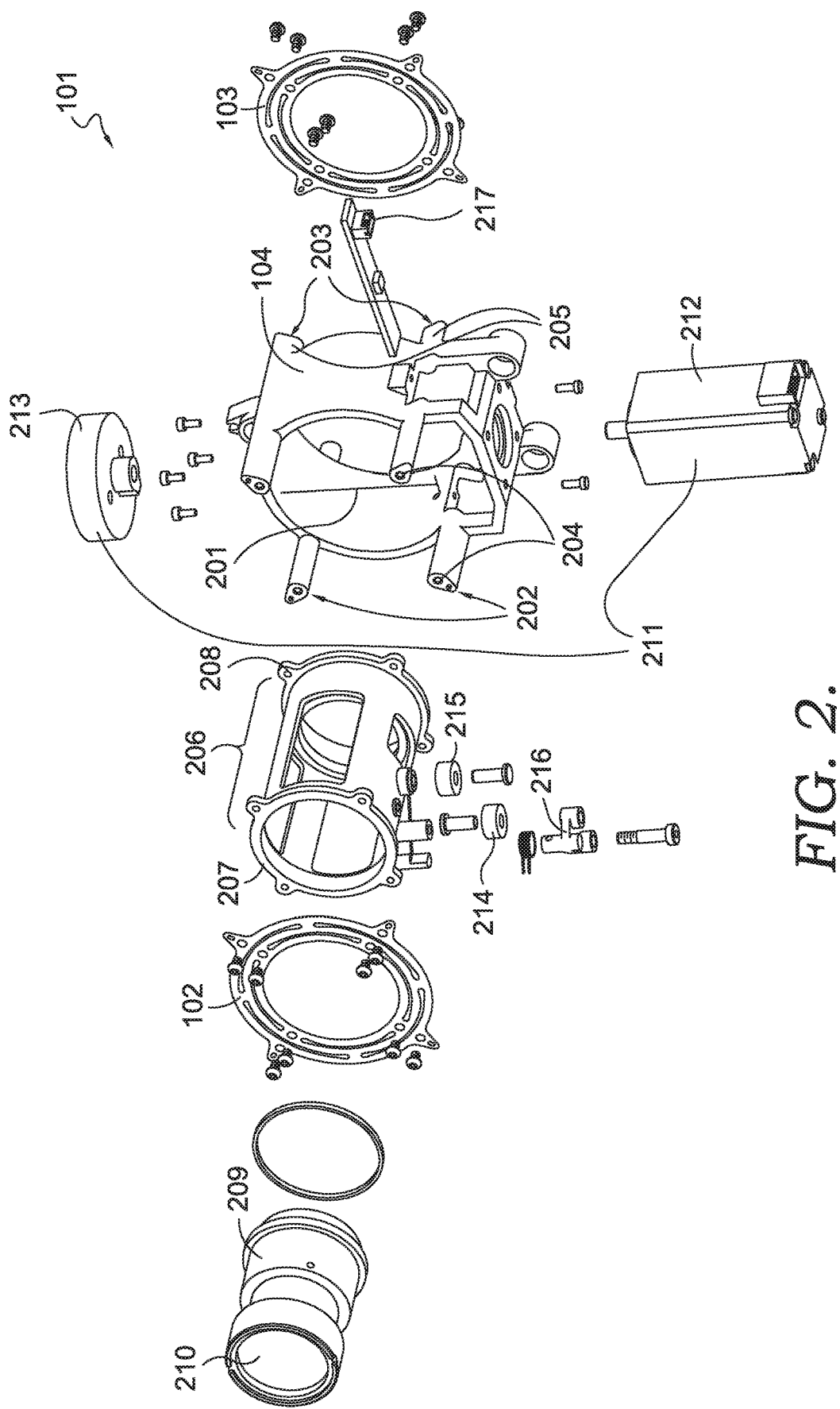
FIG. 2 is an exploded view of the exemplary apparatus of FIG. 1.

Referring now to FIG. 2, an exploded view of the camera system 101 displays additional aspects in more detail. The frame 104 has an aperture 201 extending from a first frame end 202 to a second frame end 203. The first frame end 202 comprises a first edge 204 around the aperture 201. The second frame end 203 comprises a second edge 205 around the aperture 201. A lens shuttle 206 is configured to be housed within the aperture 201. When assembled, the lens shuttle 206 is suspended by the first flex member 102 and second flex member 103. The lens shuttle 206 has a first body end 207 and a second body end 208. The lens shuttle 206 is fit to house a lens assembly 209 with a lens 210.

When assembled, the first flex member 102 and second flex member 103 each couple the lens shuttle 206 to the frame 104. The first flex member 102 couples the first frame end 202 and first body end 207, whereas the second flex member 103 couples the second frame end 203 and the second body end 208. In some aspects, the first flex member 102 is fixed to the frame by the first edge 204 and the second flex member 103 is fixed to the frame 104 by the second edge 205. The edge of the frame 104 need not be continuous. Rather, the edge of the frame 104 can be the surface area at the ends of the frame 104. In the aspect shown, the lens 210 is oriented toward the first body end 207.

In some aspects, the flex members comprise a material with a flexural modulus. When the first flex member 102 and second flex member 103 flex in the same linear direction with respect to the frame 104, the lens shuttle 206 similarly moves. This flexural modulus allows the lens shuttle 206 to actuate in a linear direction with little lateral movement with respect to the frame 104. The shuttle driver 211 is configured to articulate the lens shuttle 206 housed within the aperture 201, and is configured to flex the first flex member 102 and second flex member 103 a defined flex distance. The illustrated shuttle driver 211 includes a stepper motor 212 configured to drive a cam 213. The fully assembled stepper motor 212 and cam 213 are illustrated in FIG. 1.

Continuing with FIG. 2, the flex distance is limited by the flexural modulus of the flex members. In some aspects, the flex distance is optimized to move the lens shuttle 206 and lens 210 to keep the lens assembly 209 in focus. This flex distance can further be optimized for the changes in focus necessary to capture various sizes and/or resolutions of barcodes on various sizes of boxes along a conveyer belt. In some aspects the flex distance is −1.5 mm and +1.5 mm from a no-flex state of the first flex member 102 and second flex member 103. These values for flex distance can provide an optimal actuation of the lens 210 for the lens assembly 209 to stay in focus when used to read barcodes of items on a conveyer belt.

The cam 213 is connected to the lens shuttle 206 using a first follower 214 and a second follower 215 and an idler 216. As shown in FIG. 1 and FIG. 2, the idler 216 is fixed to the lens shuttle 206 with the first follower 214 configured to reside outside of the cam 213 and the second follower 215 configured to reside inside the cam 213. The cam 213 may have a variable radius and be configured to rotate, for example, 330 degrees. In such environment, as the cam 213 is rotated by the stepper motor 212, the first follower 214 and second follower 215 are actuated with the variable radius of the cam 213 to move the idler 216 which actuates the lens shuttle 206. The lens shuttle 206 is free to actuate by the motion of the idler 216 and connected parts due to the lens shuttle 206 being suspended by the flex members. Therefore, the rotation of the cam 213 may be commensurate with the flex distance.

With reference to FIGS. 1 and 2, the rotation of the cam 213 can be measured by a position sensor 217. The position sensor 217 may be an absolute position sensor that identifies magnetic fields. In some aspects the cam 213 contains a magnetic dipole and the position sensor 217 can identify the angle of the magnet based on the magnetic field. Therefore, in operation, as the cam 213 rotates, the position sensor 217 can identify the exact angle of the cam 213. This information can be used to identify the flex distance of the lens shuttle 206, which may then be relayed to a computer device.

Figure 3:
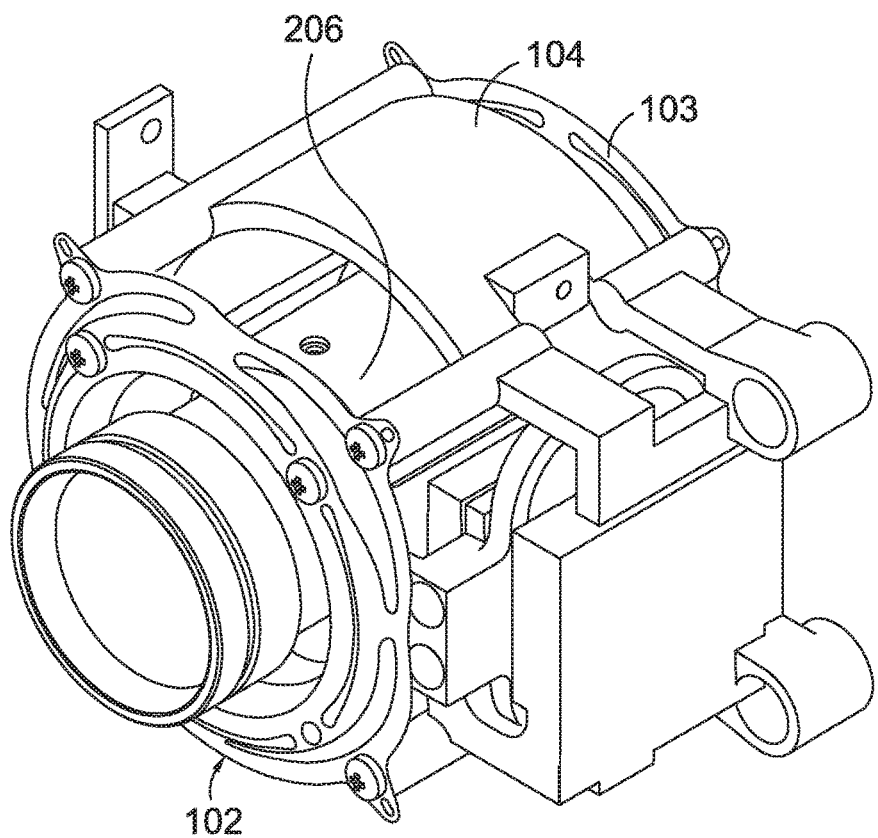
FIG. 3 is an exemplary view of the flex members actuated a flex distance.

Actuation of the flex members is shown in FIG. 3. The first flex member 102 and second flex member 103 are flexed in the same linear direction with respect to the frame 104, and the lens shuttle 206 has been moved by a particular flex distance. Comparing FIG. 3 to FIG. 1, the flex of the flex members is displayed from a rest state in FIG. 1 to the flexed state in FIG. 3. The flex distance may either be in the forward or reverse direction, but the flex members move in the same linear direction with respect to the frame 104 to move the lens shuttle 206.

Figure 4:
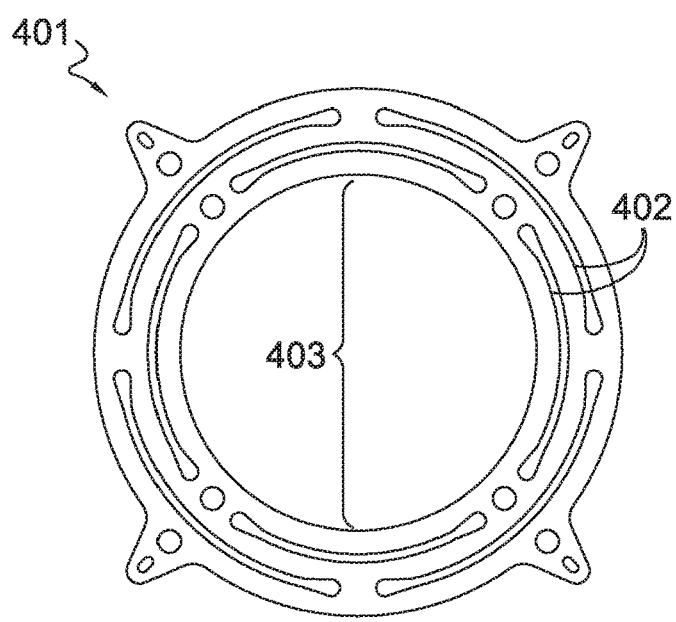
FIG. 4 is a view of the exemplary flex member of FIG. 1.

FIG. 4 is a view of the exemplary flex members of FIG. 1, shown here as flex member 401. In one aspect, flex members 102 and 103 of FIG. 1 are similar to one another or even the same, but in some aspects, these flex members may have different characteristics. In some aspects, first flex member 102 and the second flex member 103 are made of a material such that the maximum deflection of the linear movement of the camera causes a maximum stress on the flex members that is less than the material's fatigue stress limit. In an exemplary aspect, flex members 102 and 103 may be a sheet of Beryllium-Copper. Beryllium-Copper offers a high flexural modulus that can withstand many flexes. Many other thin metal sheet materials, such as copper-alloys, may be used that offer a flexural modulus acceptable to actuate a lens shuttle.

Exemplary flex member 401 comprises a series of ducts 402 that enhance the flexural modulus of the exemplary flex member 401. The ducts 402 enhance the linear actuation of the suspended lens shuttle 206, however the ducts 402 allow for very little lateral motion with respect to the frame 104, shown in FIG. 1. Exemplary flex member 401 also has a flex member aperture 403, which is further described below.

With reference to FIG. 4, and FIG. 1, the flex member aperture 403 is large enough for the lens 210 of the lens assembly 209 to have full view of a subject for capture. Providing an aperture of sufficient size in the exemplary flex member 401 allows the sensor to be unobstructed and maximize the viewable area. In aspects where the lens assembly 209 is configured to identify bar code labels, maximizing the viewable area can be helpful where a package that is not viewed by the camera may not be identified.

Figure 5:
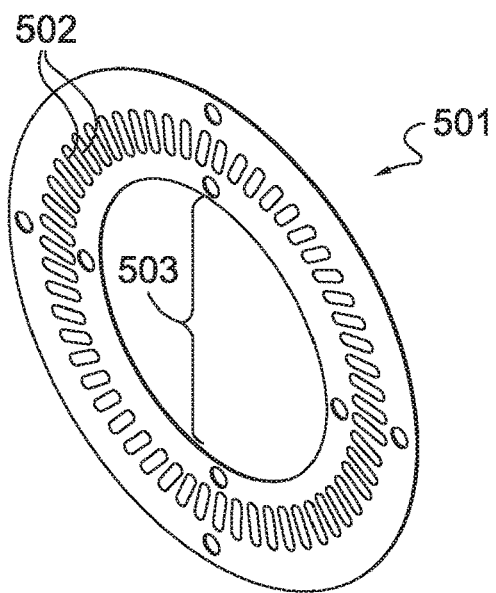
FIG. 5 is a view of an alternative exemplary flex member.

FIG. 5 displays another exemplary flex member 501. In this aspect, the ducts 502 are arranged radially about the aperture 503. Even with this alternative orientation of the ducts 502, the ducts 502 are still able to enhance the flexural modulus of flex member 501.

Figure 6:
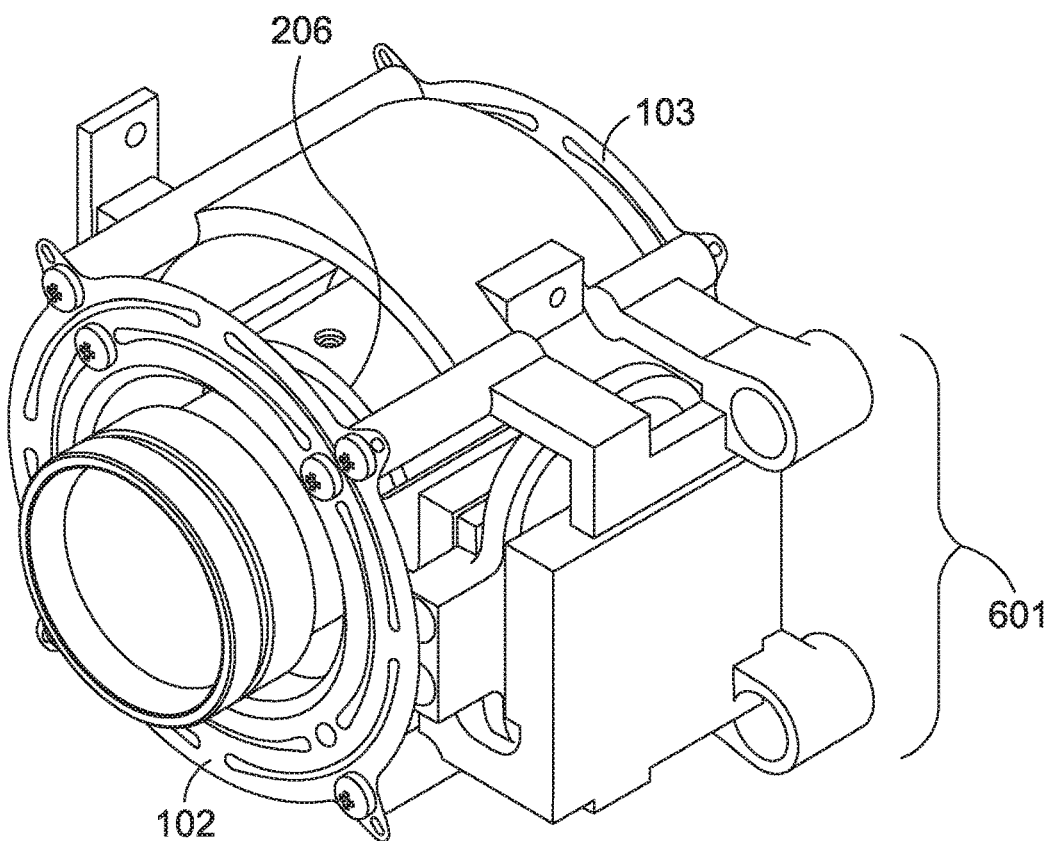
FIG. 6 is a perspective view of an exemplary apparatus driven by a voice coil.

FIG. 6 shows an alternative shuttle driver for the lens shuttle 206. It is understood that many different shuttle drivers may be used to actuate the lens shuttle 206 using the first flex member 102 and second flex member 103. The alternative shuttle driver in FIG. 6 is a voice coil assembly 601. Voice coil assemblies 601 can consist of two separate parts and a magnetic housing and coil where applying a voltage across the terminals of the motor causes the motor to move in one direction. As the voice coil assembly 601 moves, the lens shuttle 206 is similarly actuated to the max flex distance.

It is contemplated that combinations of the various aspects described may be implemented. The lens assembly in all aspects may be configured to identify bar code labels, or may be configured for traditional photography of scenery and persons. Additionally, the flex distance may be optimized for traditional photography implementations to keep the subject in focus. The orientation of ducts and materials used in flex members may vary to optimize the flexural modulus of the given material.

It is further contemplated that the lens shuttle may extend the length of the aperture of the frame. It is further contemplated that the lens shuttle may extend beyond the first frame end or second frame end. In other aspects, the lens shuttle may extend within the first frame end and second frame end. In each of these aspects, the flex members suspend the lens shuttle in the aperture of the frame.

While preferred aspects are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A camera comprising:
    a frame extending from a first frame end to a second frame end opposite the first frame end, the frame comprising an aperture extending from the first frame end to the second frame end, the first frame end comprising a first edge around the aperture and the second frame end comprising a second edge around the aperture;
    a lens shuttle housed within the aperture suspended by a first flex member and a second flex member, the lens shuttle having a first body end and a second body end, the lens shuttle fit to house a lens assembly with a lens, the lens of the lens assembly oriented toward the first body end;
    the first flex member coupling the lens shuttle to the frame, the first flex member coupled to the first frame end and the first body end; and
    the second flex member coupling the lens shuttle to the frame, the second flex member coupled to the second frame end and the second body end,
    wherein the first flex member and the second flex member each comprise a material with a flexural modulus, wherein a flex of the first flex member and the second flex member in the same linear direction correspond to an equal linear movement of the lens shuttle with respect to the frame.

2. The camera of claim 1, wherein the first flex member and the second flex member are each made of a material that the maximum deflection of the linear movement of the lens shuttle exudes a maximum stress on the flex that is less than the material's fatigue stress limit.

3. The camera of claim 1, wherein the first flex member and the second flex member further each comprise a series of ducts configured to enhance the flexural modulus.

4. The camera of claim 1, wherein the first flex member comprises an aperture configured to allow the lens assembly a full view of a subject for capture.

5. The camera of claim 1, wherein the first flex member is fixed to the frame by the first edge and the second flex member is fixed to the frame by the second edge.

6. An imaging system comprising:
    a frame extending from a first frame end to a second frame end opposite the first frame end, the frame comprising an aperture extending from the first frame end to the second frame end, the first frame end comprising a first edge around the aperture and the second frame end comprising a second edge around the aperture;
    a lens shuttle housed within the aperture suspended by a first flex member and a second flex member, the lens shuttle having a first body end and a second body end, the lens shuttle fit to house a lens assembly, the lens of the lens assembly oriented toward the first body end;
    the first flex member coupling the lens shuttle to the frame, the first flex member coupled to the first frame end and the first body end, the first flex member comprising a material with a flexural modulus and a flex camera aperture configured to allow the lens assembly a full view of a subject for capture;
    the second flex member coupling the lens shuttle to the frame, the second flex member coupled to the second frame end and the second body end, the second flex member comprising a material with a flexural modulus and the flex camera aperture; and
    a shuttle driver configured to articulate the lens shuttle housed within the aperture, configured to flex the first flex member and second flex member a defined flex distance.

7. The imaging system of claim 6, wherein the lens assembly is configured to identify bar code labels.

8. The imaging system of claim 7, wherein the defined flex distance is the optimal distance for the lens assembly to adjust to various sizes of bar code labels.

9. The imaging system of claim 6, wherein the first flex member and second flex member are each made of a material that the maximum deflection of the linear movement of the lens shuttle exudes a maximum stress on the flex that is less than the material's fatigue stress limit.

10. The imaging system of claim 6, wherein the first flex member and second flex member each comprise a sheet of Beryllium-Copper.

11. The imaging system of claim 6, wherein the first flex member and second flex member further each comprise a series of ducts configured to enhance the flexural modulus, the series of ducts configured to resist lateral movement of the lens shuttle.

12. The imaging system of claim 6, wherein the shuttle driver comprises a voice coil.

13. The imaging system of claim 6, wherein the shuttle driver comprises a cam driven by a stepper motor.

14. The imaging system of claim 13, wherein the cam is connected to the lens shuttle using a first follower and second follower ratably fixed to an idler, the idler fixed to the lens shuttle, the first follower configured to reside outside of the cam and the second follower configured to reside inside the cam, and configured such that actuation of the cam moves the idler.

15. An auto-focusing imaging system comprising:
a frame extending from a first frame end to a second frame end opposite the first frame end, the frame comprising an aperture extending from the first frame end to the second frame end, the first frame end comprising a first edge around the aperture and the second frame end comprising a second edge around the aperture;
a lens shuttle housed within the aperture suspended by a first flex member and a second flex member, the lens shuttle having a first body end and a second body end, the lens shuttle fit to house a lens assembly, the lens of the lens assembly oriented toward the first body end;
the first flex member coupling the lens shuttle to the frame, the first flex member coupled to the first frame end and the first body end, the first flex member comprising a material with a flexural modulus and a flex camera aperture configured to allow the lens assembly a full view of a subject for capture;
the second flex member coupling the lens shuttle to the frame, the second flex member coupled to the second frame end and the second body end, the second flex member comprising a material with a flexural modulus and the flex camera aperture;
a cam driven by a stepper motor configured to provide linear actuation of the lens shuttle housed within the aperture, configured to, as the lens shuttle is actuated, flex the first flex member and second flex member a defined flex distance; and
a position sensor configured to read the angle of rotation of the cam and relay the information to a computer device.

16. The autofocusing image system of claim 15, wherein the lens assembly is configured to identify bar code labels and an optimal distance for the lens assembly to adjust to various sizes of bar code labels.

17. The autofocusing image system of claim 16, wherein the lens assembly is configured to relay bar code labels and image quality data to the computer device.

18. The autofocusing image system of claim 17, wherein the flex distance is between −1.5 mm and +1.5 mm from a no-flex state of the first flex member and second flex member.

19. The autofocusing image system of claim 17, wherein the first flex member is fixed to the frame by attaching to the first edge and the second flex member is fixed to the frame by the second edge.

20. The camera of claim 1, wherein the first flex member and second flex member each comprise a sheet metal material.

* * * * *